Jan. 23, 1940. I. HENNE 2,187,899
DENTAL FLOSS THROW-AWAY UNIT
Filed March 25, 1938
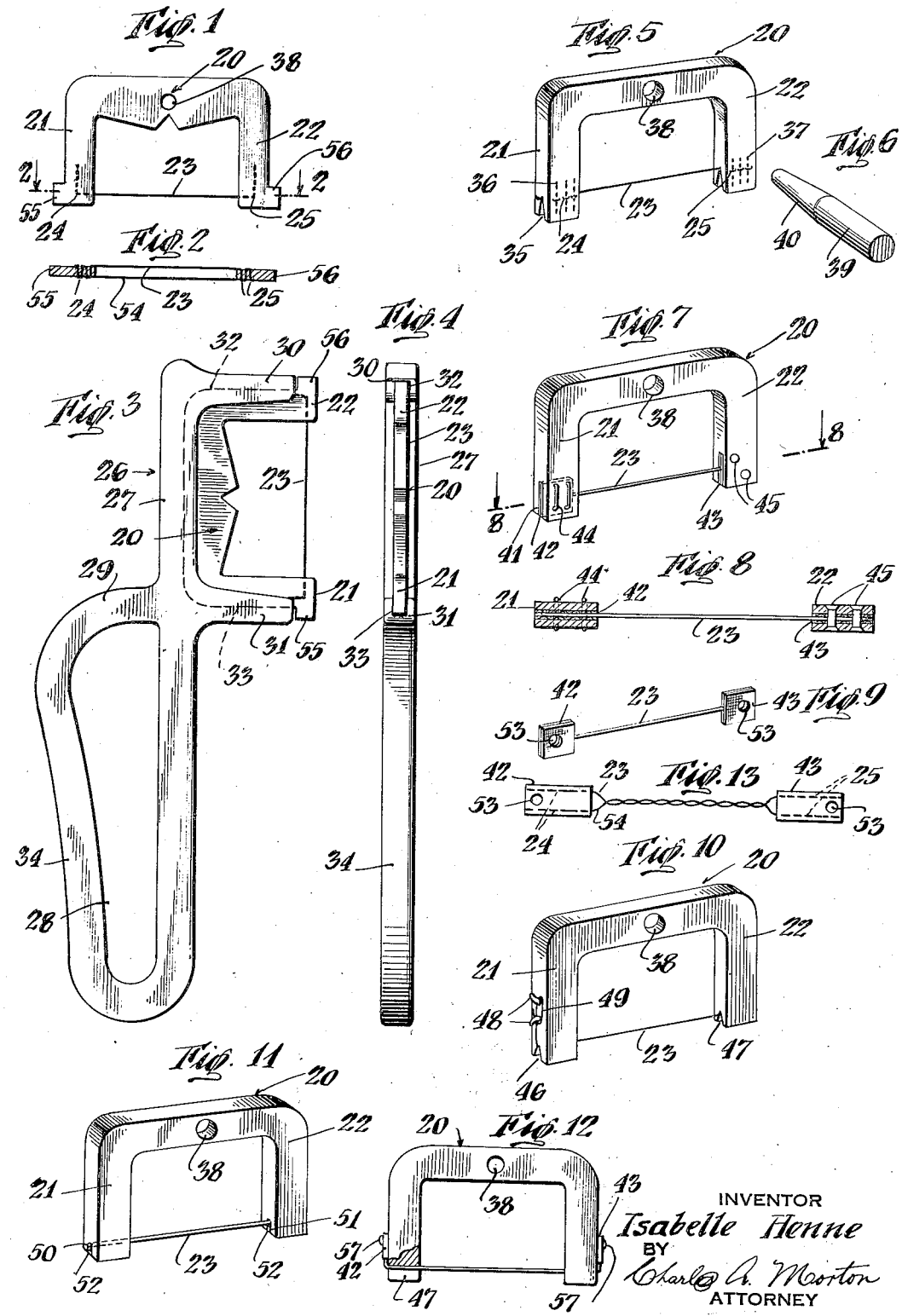
INVENTOR
Isabelle Henne
BY
Charles A. Morton
ATTORNEY Patented Jan. 23, 1940

2,187,899

UNITED STATES PATENT OFFICE 2,187,899

DENTAL FLOSS THROW-AWAY UNIT

Isabelle Henne, Brooklyn, N. Y.

Application March 25, 1938, Serial No. 198,008

11 Claims. (Cl. 132—91)

This invention relates to a dental floss throw-away unit.

Heretofore it has been proposed to string dental floss upon a bow shaped handle to form a dental tool for removing food particles from the spaces between the teeth. Such a device is not only relatively costly but is likewise not suitable for pocket use.

The object of this invention is a relatively inexpensive sanitary throw-away dental floss unit which can be used as a substitute for a toothpick and carried in the pocket or purse.

Another object is an inexpensive sanitary interchangeable throw-away dental floss unit adapted to be used in combination with a reinforcing handle member or holder, from which said dental floss unit can be readily detached and thrown away after using.

Other objects will appear from the detailed description which follows.

In the drawing comprising but a single sheet of thirteen (13) figures numbered Figs. 1 to 13 inclusive.

Fig. 1 is a front view of one form of throw-away unit.

Fig. 2 is a cross-sectional view taken along the line 2—2 of Fig. 1, looking in the direction of the arrows.

Fig. 3 is a side view of a holder with a throw-away unit in place.

Fig. 4 is an end view of the device of Fig. 3 looking from the right of that figure.

Fig. 5 is a modified form of throw-away unit.

Fig. 6 is a perspective view of a handle member.

Fig. 7 shows a modified form of throw-away unit.

Fig. 8 is a cross-sectional view taken along the line 8—8 of Fig. 7 looking in the direction of the arrows.

Fig. 9 is a perspective view of a throw-away dental floss unit.

Figs. 10, 11 and 12 are perspective views of other modified forms of throw-away units; and Fig. 13 shows a modified form of throw-away dental floss unit.

Like reference characters designate corresponding parts throughout the several figures of the drawing.

Referring to Figs. 1 and 2 the throw-away unit 20 is made of any suitable rigid inexpensive material such as a press punching of laminated pressed cardboard or the like; any other suitable inexpensive material may however be substituted for pressed cardboard. The frame of throw-away unit 20 may be of any preferred shape but as illustrated in the drawing it is substantially U or bow shaped, the open tips of the U or bow constituting extension arms 21 and 22 between which a section of dental floss 23 is held under tension, said dental floss being stitched at 24 to extension arm 21 and at 25 to extension arm 22 to anchor dental floss 23 in position, the lines of stitches may run along the extension arms to increase the anchorage of the dental floss, and reinforce the pressed cardboard against splitting. The extension arms 21 and 22 may be provided with enlarged ends consisting of laterally outwardly projecting flanges 55 and 56 to facilitate stitching. The lines of stitches 24 and 25 may be formed by a sewing machine employing the dental floss as the stitching medium, in which event both the needle thread represented by the dental floss 23 and the bobbin thread represented by the dental floss 54 (Fig. 2) may be anchored under tension between the extension arms 21 and 22; or the thread 54 may if preferred be removed as by cutting after the unit has been formed so that said unit will then include only a single string of dental floss 23. Instead of stitching the threads of dental floss 23 and 54 to the extension arms 21 and 22 as previously described, the dental floss may be formed as a closed loop and passed over the extension arms 21 and 22 to lodge in the angles formed between the extension arms 21 and 22 and their associated laterally projecting flanges 55 and 56; or the loop of dental floss thus formed might be fastened in suitable saw cuts formed in the surface of the extension arms 21 and 22. When the parallel sections of dental floss 23 and 54 are both used (Fig. 2) the unit may be inserted in the mouth so that a tooth separates the threads 23 and 54, and the threads enter the spaces between the said tooth and the teeth on either side thereof, or the unit may be manipulated to engage both threads 23 and 54 in the same space at once. Instead of stitching the dental floss 23 to the extension arms 21 and 22, it may, if preferred, be cut in unit lengths or loops, and permanently anchored to the extension arms 21 and 22 (and to the laterally outwardly projecting flanges 55 and 56) by lines of stitching traversing over the surface of said extension arms (and flanges) and extending through the material thereof from front to rear and back again.

The sanitary throw-away unit 20 thus formed is relatively inexpensive to manufacture and can be given away in individual sanitary envelopes as a sterilized and inexpensive substitute for a toothpick, the unit 20 being thrown away after using. As the dental floss 23 is permanently anchored to the extension arms 21 and 22, any attempt to remove the section of dental floss 23 would ordinarily so damage the framework as to render it unsuited for re-stringing, thus, and owing to the low original cost of the throw-away unit 20, insuring the discarding of the said unit in its entirety after using.

The throw-away unit 20 may be operated by grasping one of the extension arms as for example extension arm 22 between the thumb and finger, dental floss 23 being inserted in the spaces between adjacent teeth to remove foreign particles, or the tapered end 40 of the handle member 39 (Fig. 6) may be inserted in the opening 38 when the throw-away unit 20 is to be used. The handle member 39 may be carried in the pocket for re-use with sterilized replacements of the throw-away unit 20.

In lieu of the handle 39 a holder 26 (Figs. 3 and 4) may be provided for throw-away unit 20. Holder 26 may consist of a handle member 34 having a grooved back member 27 and upper and lower grooved shoulders 30 and 31 for detachably engaging the frame of throw-away unit 20. Upper shoulder 30 is provided with a groove 32 and lower shoulder 31 with a groove 33, the throw-away unit 20 being slidably insertable in the opening between said grooved shoulders, the throw-away unit forming a tight fit in said grooves and being retained in place by frictional engagement. Holder 26 may be made of any suitable plastic material, or it may be made of metal if preferred, or the shoulders 30 and 31 may be made of resilient material such as spring steel, the shoulders being adapted to be forced apart by the extension arms 21 and 22 when the throw-away unit 20 is inserted in holder 26 to retain throw-away unit 20 in position. Suitable spring catches (not shown) for holding throw-away unit 20 in position may be substituted. Handle member 34 may be open at 28 for lightening without sacrificing handle strength. Handle member 34 may be held in the hand with the thumb pressing upon the shoulder 29 thereby substantially increasing the gripping effect.

Many alternative forms of construction of my sanitary throw-away unit will occur to those skilled in the art. For purposes of illustration only, and not by way of limitation, several alternative constructions are shown in Figs. 5, 7, 9, 10, 11, 12 and 13.

In Fig. 5 the dental floss 23 is secured under tension in the grooves 35 and held in place by lines of stitches as previously described. To prevent splitting of the extension arms 21 and 22 of the bow shaped frame a series of lines of stitches 24 and 25 may be formed in their respective extension arms.

To improve the anchorage of the dental floss in the extension arms 21 and 22, the tips of the dental floss may be glued between folds of fabric forming anchoring wads 42 and 43 (Fig. 9). These anchoring wads are adapted to be inserted in slots 41—41 formed in the tips of extension arms 21 and 22, the anchoring wads 42 and 43 being thereafter secured in the slots 41—41 in any suitable manner as: (a) by gluing; (b) by means of metal staples 44—44 (see extension arm 21 of Figs. 7 and 8); or (c) by means of countersunk rivets 45—45 (see extension arm 22 of Figs. 7 and 8).

A unit length of dental floss 23 may likewise be stretched under tension in the slots 46—47 (Fig. 10) and anchored by winding the free ends 49 of the dental floss around a pair of butterfly winding posts 48 attached to the extension arms 21 and 22 of the throw-away unit 20.

A unit length of dental floss 23 may likewise be embedded in transverse slots 50 and 51 (Fig. 11) formed in the ends of extension arms 21 and 22 and then glued in place with a suitable glue or cement 52.

The anchoring wads 42 and 43 of the unit length of dental floss 23 (Fig. 9) may be provided with openings 53—53, and the dental floss 23 may be secured in stretched position in the frame of throw-away unit 20 by attaching the anchoring wads 42 and 43 to pins 57 (Fig. 12) fastened to the ends of the extension arms 21 and 22 as illustrated in said figure.

Instead of gluing the dental floss 23 and/or 54 in the anchoring wads 42 and 43 (Fig. 9), strand 23 and/or strand 54 may be stitched to the wads by lines of stitches 24, 25 (Fig. 13). To insure correct tension of the dental floss, the anchoring wads 42 and 43 may be twisted in opposite directions to form the threads 23 and 54 into a twisted strand and in this manner it may be adjusted to the correct length. The anchoring wads 42 and 43 may now be anchored to pins 57 (Fig. 12) by means of the openings 53—53, or the wads 42 and 43 may be secured in suitable slots 41 (Figs. 7 and 8) of the frame of throw-away unit 20, by gluing, by stapling at 44, or by countersunk rivetting at 45. The threads of dental floss 23, 54 (Fig. 2), may be formed into a twisted strand during the stitching operation, the use of a double twisted strand being applicable also to the structure of Figs. 5, 10 and 11.

Other methods of anchoring the dental floss in the frame of throw-away unit 20 will be obvious to those skilled in the art.

What is claimed is:

1. An inexpensive sanitary throw-away dental unit comprising a sterilized yoke portion, a plurality of sterilized end pieces positioned in spaced relation upon said yoke, said yoke and end pieces being made of inexpensive material, a section of sterilized dental floss stretched under tension between said end pieces in spaced relation to said yoke, and means for permanently anchoring said dental floss to said end pieces and for retaining said dental floss under tension at all times between said end pieces and relative to said yoke, said yoke, end pieces, and section of dental floss, in conjunction, thus forming an inexpensive sanitary throw-away dental unit, said unit being adapted to be inserted in the mouth with the tensioned dental floss engageable in the space between adjacent teeth to remove foreign particles therefrom and thereafter thrown away without appreciable loss.

2. A sanitary throw-away dental unit comprising a sterilized miniature bow shaped rigid framework formed out of an inexpensive material, a section of sterilized dental floss stretched under tension between the tips of said bow, the bow being small enough to be insertable in the mouth with the sterilized dental floss engageable in the space between adjacent teeth, and a line of sterilized stitches for anchoring said dental floss to said framework and for retaining said dental floss under tension at all times between said bow tips.

3. A sanitary throw-away dental unit comprising a sterilized miniature bow shaped punching of inexpensive material defining a rigid framework, the bow tips constituting extension arms, and a section of sterilized dental floss self-stitched to said extension arms by lines of stitches extending across and along a portion of the arms to securely anchor said dental floss to said extension arms and to retain said dental floss stretched under tension, to complete said unit, said unit being small enough to be insertable in the mouth with the dental floss engageable in the space between adjacent teeth.

4. A sanitary throw-away dental unit comprising a sterilized miniature bow shaped punching of inexpensive material defining a framework, the tips of said bow being slotted, a unit length of dental floss adapted to be suspended between the bow tips, wads of fabric attached to the opposite ends of said length of dental floss, said wads being adapted to be inserted in the slots of said bow tips to stretch said dental floss under tension therebetween, and means for anchoring said wads in said slots.

5. A sanitary throw-away dental unit comprising a sterilized miniature bow shaped punching of inexpensive material defining a framework, a unit length of dental floss, wads of fabric attached to the opposite ends of said length of dental floss and adapted to be secured to said bow tips to stretch said dental floss between said bow tips under tension, and means for securing said wads of fabric to the bow tips to tension said unit length of dental floss.

6. A sanitary throw-away dental unit comprising a sterilized miniature bow-shaped punching of inexpensive material defining a framework, a plurality of threads of dental floss, wads of fabric attached to the opposite ends of said threads, said wads of fabric being twisted in opposite directions to adjust the length of the dental floss, said twisted strand of dental floss as thus adjusted being short enough to remain under tension when extended from one bow tip to the other, and means for anchoring said wads of fabric to said bow tips to tension said twisted strand.

7. A sanitary throw-away dental unit comprising a sterilized miniature bow shaped punching of inexpensive material defining a framework small enough to be inserted in the mouth, and a plurality of threads of dental floss stitched to said bow tips, the lines of stitches being disposed across the bow tips and then inward along a portion of the bow, said threads of dental floss being stretched under tension in parallel spaced relation between said bow tips.

8. A throw-away dental unit comprising a unit length of dental floss and anchoring wads permanently secured to the opposite ends of said unit length of dental floss whereby said unit length can be secured under tension to a dental holder.

9. In a dental tool the combination with a sterilized miniature bow shaped framework punched out of an inexpensive material, said framework being small enough to be inserted in the mouth, and a section of sterilized dental floss stretched under tension between the bow tips engageable in the spaces between adjacent teeth, said punching and dental floss forming a sanitary throw-away unit; of a holder wherein said unit may be detachably secured comprising a back member, upper and lower grooved shoulder members projecting laterally from the upper and lower ends of said back member to form a casing for slidably receiving said throw-away unit, and a handle member in continuation of said back member, said handle member including a rounded shoulder portion in continuation of said lower shoulder and projecting rearwardly from said handle to define a thumb rest.

10. In a dental tool the combination with a sterilized miniature bow shaped framework fashioned out of an inexpensive material, said framework being small enough to be insertable in the mouth, and a section of sterilized dental floss stretched under tension between the bow tips engageable in the spaces between adjacent teeth, said framework and dental floss forming a sanitary throw-away unit; of a holder wherein said throw-away unit may be detachably secured comprising a back member, upper and lower shoulders projecting laterally from the back member, said back member and shoulders in conjunction forming a casing for receiving said throw-away unit, and a handle member secured to said back member.

11. A throw-away dental unit comprising a plurality of threads of dental floss, a plurality of anchoring wads, one set of said thread ends being permanently secured to one of said anchoring wads, and the opposite set of said thread ends being permanently secured to the other anchoring wad, whereby said anchoring wads may be twisted in opposite directions to insure correct tension of the threads of dental floss.

ISABELLE HENNE.